(12) United States Patent
Gangi (10) Patent No.: US 8,261,978 B2
(45) Date of Patent: Sep. 11, 2012

(54) WALLET CONSOLIDATOR TO FACILITATE A TRANSACTION

(75) Inventor: Frank Gangi, Fairview, TX (US)

(73) Assignee: E-Micro Corporation, Fairview, TX (US)

( * ) Notice: Subject to any disclaimer, the term of this patent is extended or adjusted under 35 U.S.C. 154(b) by 0 days.

(21) Appl. No.: 13/219,395

(22) Filed: Aug. 26, 2011

(65) Prior Publication Data

US 2012/0041815 A1 Feb. 16, 2012

Related U.S. Application Data

(60) Continuation of application No. 12/721,769, filed on Mar. 11, 2010, which is a continuation of application No. 11/931,479, filed on Oct. 31, 2007, now Pat. No. 7,708,198, which is a division of application No. 09/923,617, filed on Aug. 6, 2001, now Pat. No. 7,349,885, which is a continuation of application No. 09/618,407, filed on Jul. 18, 2000, now Pat. No. 6,293,462, which is a continuation of application No. 09/087,193, filed on May 29, 1998, now Pat. No. 6,131,811.

(51) Int. Cl.
*G06K 5/00* (2006.01)
*G06Q 40/00* (2006.01)

(52) U.S. Cl. ......... 235/380; 235/379; 235/381; 235/382

(58) Field of Classification Search .......... 235/379–382, 235/492, 493, 441; 705/14, 14.01, 26, 26.1, 705/70–75, 35, 38–41
See application file for complete search history.

(56) References Cited

U.S. PATENT DOCUMENTS

| 3,845,277 A | 10/1974 | Voss et al. |
| 4,016,405 A | 4/1977 | McCune et al. |
| 4,102,493 A | 7/1978 | Moreno |
| 4,214,230 A | 7/1980 | Fak et al. |

(Continued)

FOREIGN PATENT DOCUMENTS

AU 732877 12/1998

(Continued)

OTHER PUBLICATIONS

Smart Card News; "British Govt Launches Smart Card Initiative"; Dec. 1997; vol. 6, No. 12; pp. 221-240.*

(Continued)

*Primary Examiner* — Ella Colbert
(74) *Attorney, Agent, or Firm* — Slater & Matsil, L.L.P.

(57) ABSTRACT

A wallet consolidator to warehouse information pertaining to at least one card and to retrieve the warehoused information to facilitate a transaction is provided. An embodiment of a Wallet consolidator can include a housing, one or more input devices positioned to receive information, and a memory device positioned to store at least a portion of the information received by the one or more input devices. The wallet consolidator can also include a radio frequency wireless communication interface associated with the housing and adapted to communicate with a point-of-sale terminal thereby to provide at least a portion of the Information stored in the memory device to the point-of-sale terminal, a display screen, and a controller positioned within the housing in communication with and to control each of the one or more input devices, the memory device, the radio frequency wireless communication interface, and the display screen.

10 Claims, 3 Drawing Sheets

U.S. PATENT DOCUMENTS

| | | |
|---|---|---|
| 4,234,932 A | 11/1980 | Gorgens |
| 4,253,017 A | 2/1981 | Whitehead |
| 4,314,352 A | 2/1982 | Fought |
| 4,390,968 A | 6/1983 | Hennessy et al. |
| 4,437,130 A | 3/1984 | Hennessy et al. |
| 4,438,326 A | 3/1984 | Uchida |
| 4,443,027 A | 4/1984 | McNeely et al. |
| 4,458,142 A | 7/1984 | Bernstein |
| 4,614,861 A | 9/1986 | Pavlov et al. |
| 4,634,845 A | 1/1987 | Hale et al. |
| 4,650,978 A | 3/1987 | Hudson et al. |
| 4,679,236 A | 7/1987 | Davies |
| 4,701,601 A | 10/1987 | Francini et al. |
| 4,705,211 A | 11/1987 | Honda et al. |
| 4,707,594 A | 11/1987 | Roth |
| 4,742,351 A | 5/1988 | Suzuki |
| 4,755,940 A | 7/1988 | Brachtl et al. |
| 4,772,782 A | 9/1988 | Nonat |
| 4,791,283 A | 12/1988 | Burkhardt |
| 4,837,422 A | 6/1989 | Dethloff et al. |
| 4,837,822 A | 6/1989 | Crosley et al. |
| 4,849,613 A | 7/1989 | Eisele |
| 4,868,376 A | 9/1989 | Lessin et al. |
| 4,918,631 A | 4/1990 | Hara et al. |
| 4,926,480 A | 5/1990 | Chaum |
| 4,928,001 A | 5/1990 | Masada |
| 4,959,788 A | 9/1990 | Nagata et al. |
| 4,960,982 A | 10/1990 | Takahira |
| 4,990,759 A | 2/1991 | Gloton et al. |
| 5,010,237 A | 4/1991 | Kawana |
| 5,095,196 A | 3/1992 | Miyata |
| 5,128,520 A * | 7/1992 | Rando et al. .................. 235/375 |
| 5,130,519 A | 7/1992 | Bush et al. |
| 5,135,095 A | 8/1992 | Kocznar et al. |
| 5,157,247 A | 10/1992 | Takahira |
| 5,168,520 A | 12/1992 | Weiss |
| 5,192,947 A | 3/1993 | Neustein |
| 5,220,501 A | 6/1993 | Lawlor et al. |
| 5,221,838 A | 6/1993 | Gutman et al. |
| 5,276,311 A | 1/1994 | Hennige |
| 5,317,636 A | 5/1994 | Vizcaino |
| 5,371,797 A | 12/1994 | Bocinsky, Jr. |
| 5,373,558 A | 12/1994 | Chaum |
| 5,375,037 A | 12/1994 | Le Roux |
| 5,412,192 A | 5/1995 | Hoss |
| 5,426,283 A | 6/1995 | Berthozat et al. |
| 5,434,398 A | 7/1995 | Goldberg |
| 5,434,919 A | 7/1995 | Chaum |
| 5,438,166 A | 8/1995 | Carey et al. |
| 5,440,108 A | 8/1995 | Tran et al. |
| 5,444,616 A | 8/1995 | Nair et al. |
| 5,448,047 A | 9/1995 | Nair et al. |
| 5,455,407 A | 10/1995 | Rosen |
| 5,471,045 A | 11/1995 | Geronimi |
| 5,473,690 A | 12/1995 | Grimonprez et al. |
| 5,497,411 A | 3/1996 | Pellerin |
| 5,504,519 A * | 4/1996 | Remillard ........................ 725/10 |
| 5,530,232 A * | 6/1996 | Taylor ........................... 235/380 |
| 5,538,442 A | 7/1996 | Okada |
| 5,557,518 A | 9/1996 | Rosen |
| 5,568,121 A | 10/1996 | Lamensdorf |
| 5,578,808 A | 11/1996 | Taylor |
| 5,585,787 A | 12/1996 | Wallerstein |
| 5,590,038 A | 12/1996 | Pitroda |
| 5,590,197 A | 12/1996 | Chen et al. |
| 5,623,552 A | 4/1997 | Lane |
| 5,627,355 A | 5/1997 | Rahman et al. |
| 5,649,118 A * | 7/1997 | Carlisle et al. .................. 705/41 |
| 5,655,008 A | 8/1997 | Futch et al. |
| 5,664,110 A * | 9/1997 | Green et al. .................. 705/27.2 |
| 5,671,280 A | 9/1997 | Rosen |
| 5,682,027 A * | 10/1997 | Bertina et al. .................. 235/380 |
| 5,689,247 A | 11/1997 | Welner |
| 5,734,722 A * | 3/1998 | Halpern ........................ 714/798 |
| 5,745,555 A | 4/1998 | Mark |
| 5,748,737 A | 5/1998 | Daggar |
| 5,754,652 A | 5/1998 | Wilfong |
| 5,754,653 A | 5/1998 | Canfield |
| 5,754,656 A | 5/1998 | Nishioka et al. |
| 5,761,309 A | 6/1998 | Ohashi et al. |
| 5,790,677 A | 8/1998 | Fox et al. |
| 5,799,067 A * | 8/1998 | Kikinis et al. ............. 379/93.06 |
| 5,818,030 A | 10/1998 | Reyes |
| 5,825,871 A | 10/1998 | Mark |
| 5,831,862 A | 11/1998 | Hetrick et al. |
| 5,832,457 A | 11/1998 | O'Brien et al. |
| 5,834,747 A | 11/1998 | Cooper |
| 5,834,756 A | 11/1998 | Gutman et al. |
| 5,844,497 A | 12/1998 | Gray |
| 5,850,442 A | 12/1998 | Muftic |
| 5,883,810 A | 3/1999 | Franklin et al. |
| 5,884,271 A | 3/1999 | Pitroda |
| 5,895,903 A | 4/1999 | Abe et al. |
| 5,905,246 A | 5/1999 | Fajkowski |
| 5,913,203 A | 6/1999 | Wong et al. |
| 5,915,226 A | 6/1999 | Martineau |
| 5,917,168 A | 6/1999 | Nakamura et al. |
| 5,923,016 A | 7/1999 | Fredregill et al. |
| 5,936,226 A | 8/1999 | Aucsmith |
| 5,936,541 A | 8/1999 | Stambler |
| 5,937,394 A | 8/1999 | Wong et al. |
| 5,940,511 A | 8/1999 | Wilfong |
| 5,953,710 A | 9/1999 | Fleming |
| 5,955,961 A | 9/1999 | Wallerstein |
| 5,956,699 A | 9/1999 | Wong et al. |
| RE36,365 E | 11/1999 | Levine et al. |
| 5,991,412 A | 11/1999 | Wissenburgh et al. |
| 6,000,608 A * | 12/1999 | Dorf ............................. 235/380 |
| 6,000,832 A | 12/1999 | Franklin et al. |
| 6,003,763 A | 12/1999 | Gallagher et al. |
| 6,012,634 A | 1/2000 | Brogan et al. |
| 6,012,636 A | 1/2000 | Smith |
| 6,014,634 A | 1/2000 | Scroggie et al. |
| 6,018,717 A | 1/2000 | Lee et al. |
| 6,024,288 A | 2/2000 | Gottlich et al. |
| 6,029,150 A | 2/2000 | Kravitz |
| 6,029,890 A | 2/2000 | Austin |
| 6,032,134 A | 2/2000 | Weissman |
| 6,038,492 A | 3/2000 | Nichols et al. |
| 6,039,244 A | 3/2000 | Finsterwald |
| 6,047,268 A | 4/2000 | Bartoli et al. |
| 6,050,493 A | 4/2000 | Fertig |
| 6,061,660 A | 5/2000 | Eggleston et al. |
| 6,061,892 A | 5/2000 | Kassi |
| 6,068,184 A | 5/2000 | Barnett |
| 6,072,870 A | 6/2000 | Nguyen et al. |
| 6,075,861 A | 6/2000 | Miller, II |
| 6,078,888 A | 6/2000 | Johnson, Jr. |
| 6,078,902 A | 6/2000 | Schenkler |
| 6,089,451 A | 7/2000 | Krause |
| 6,098,053 A | 8/2000 | Slater |
| 6,101,477 A | 8/2000 | Hohle et al. |
| 6,111,953 A | 8/2000 | Walker et al. |
| 6,119,933 A | 9/2000 | Wong et al. |
| 6,122,625 A | 9/2000 | Rosen |
| 6,129,274 A | 10/2000 | Suzuki |
| 6,131,811 A | 10/2000 | Gangi |
| 6,132,799 A | 10/2000 | Corniglion et al. |
| 6,163,771 A | 12/2000 | Walker et al. |
| D436,620 S | 1/2001 | Webb et al. |
| 6,178,408 B1 | 1/2001 | Copple et al. |
| 6,188,309 B1 | 2/2001 | Levine |
| 6,189,782 B1 * | 2/2001 | Takami et al. ................. 235/375 |
| 6,189,787 B1 | 2/2001 | Dorf |
| 6,205,436 B1 | 3/2001 | Rosen |
| 6,206,293 B1 * | 3/2001 | Gutman et al. ................ 235/493 |
| RE37,122 E | 4/2001 | Levine et al. |
| 6,213,403 B1 | 4/2001 | Bates, III |
| 6,215,665 B1 | 4/2001 | Martin |
| 6,224,109 B1 | 5/2001 | Yang |
| 6,227,447 B1 | 5/2001 | Campisano |
| 6,230,970 B1 * | 5/2001 | Walsh et al. .................. 235/379 |
| 6,230,977 B1 | 5/2001 | Johnson |
| 6,257,486 B1 | 7/2001 | Teicher et al. |
| 6,292,786 B1 | 9/2001 | Deaton et al. |
| 6,293,462 B1 | 9/2001 | Gangi |
| 6,327,578 B1 | 12/2001 | Linehan |

| | | | | | | |
|---|---|---|---|---|---|---|
| 6,332,134 B1 | 12/2001 | Foster | | 7,184,989 B2 | 2/2007 | Hansen et al. |
| 6,339,766 B1 | 1/2002 | Gephart | | 7,195,154 B2 | 3/2007 | Routhenstein |
| 6,343,284 B1 | 1/2002 | Ishikawa et al. | | 7,225,154 B2 | 5/2007 | Hansen |
| 6,345,263 B1 * | 2/2002 | Matsumoto et al. ............ 705/41 | | 7,228,292 B2 | 6/2007 | Coyle |
| 6,370,488 B1 | 4/2002 | Beaudoin et al. | | 7,257,228 B2 | 8/2007 | Wheeler et al. |
| 6,385,591 B1 | 5/2002 | Mankoff | | 7,264,152 B2 | 9/2007 | Tsuei et al. |
| 6,394,343 B1 | 5/2002 | Berg et al. | | 7,266,533 B2 | 9/2007 | Karas et al. |
| 6,402,029 B1 | 6/2002 | Gangi | | 7,309,003 B2 | 12/2007 | Algiene et al. |
| 6,425,523 B1 | 7/2002 | Shem-Ur et al. | | 7,316,350 B2 | 1/2008 | Algiene |
| 6,456,984 B1 | 9/2002 | Demoff et al. | | 7,319,977 B2 | 1/2008 | McGee et al. |
| 6,473,500 B1 | 10/2002 | Risafi et al. | | 7,328,191 B2 | 2/2008 | McGee et al. |
| 6,505,772 B1 | 1/2003 | Mollett et al. | | 7,357,312 B2 | 4/2008 | Gangi |
| 6,518,927 B2 | 2/2003 | Schremmer et al. | | 7,379,919 B2 | 5/2008 | Hogan et al. |
| 6,549,912 B1 | 4/2003 | Chen | | 7,398,225 B2 | 7/2008 | Voltmer et al. |
| 6,574,730 B1 | 6/2003 | Bissell et al. | | 7,398,252 B2 | 7/2008 | Neofytides et al. |
| 6,581,827 B1 | 6/2003 | Welton | | 2001/0034720 A1 | 10/2001 | Armes |
| 6,592,044 B1 | 7/2003 | Wong et al. | | 2001/0045454 A1 | 11/2001 | Gangi |
| 6,607,127 B2 | 8/2003 | Wong | | 2001/0047335 A1 | 11/2001 | Arndt et al. |
| 6,609,654 B1 | 8/2003 | Anderson et al. | | 2001/0048023 A1 | 12/2001 | Fitzmaurice et al. |
| 6,631,849 B2 | 10/2003 | Blossom | | 2002/0007320 A1 | 1/2002 | Hogan et al. |
| 6,636,833 B1 | 10/2003 | Flitcroft et al. | | 2002/0015168 A1 | 2/2002 | Schindler |
| 6,685,088 B1 | 2/2004 | Royer et al. | | 2002/0083010 A1 | 6/2002 | Kim |
| 6,732,919 B2 | 5/2004 | Macklin et al. | | 2002/0087462 A1 | 7/2002 | Seifert et al. |
| 6,755,341 B1 | 6/2004 | Wong et al. | | 2002/0112160 A2 | 8/2002 | Wheeler et al. |
| 6,755,344 B1 | 6/2004 | Mollett et al. | | 2002/0153414 A1 | 10/2002 | Stoutenburg et al. |
| 6,761,309 B2 | 7/2004 | Stoutenburg et al. | | 2002/0161702 A1 | 10/2002 | Milberger et al. |
| 6,789,189 B2 | 9/2004 | Wheeler et al. | | 2002/0174014 A1 | 11/2002 | Wittrup |
| 6,805,288 B2 | 10/2004 | Routhenstein et al. | | 2002/0178025 A1 | 11/2002 | Hansen et al. |
| 6,814,282 B2 | 11/2004 | Seifert et al. | | 2002/0198806 A1 | 12/2002 | Blagg et al. |
| 6,820,199 B2 | 11/2004 | Wheeler et al. | | 2003/0021242 A1 | 1/2003 | Drysdale et al. |
| 6,827,260 B2 | 12/2004 | Stoutenburg et al. | | 2003/0024979 A1 | 2/2003 | Hansen et al. |
| 6,834,270 B1 | 12/2004 | Pagani et al. | | 2003/0051145 A1 | 3/2003 | Jackson et al. |
| 6,847,953 B2 | 1/2005 | Kuo | | 2003/0055780 A1 | 3/2003 | Hansen et al. |
| 6,851,054 B2 | 2/2005 | Wheeler et al. | | 2003/0069856 A1 | 4/2003 | Seifert et al. |
| 6,857,566 B2 | 2/2005 | Wankmueller | | 2003/0097589 A1 | 5/2003 | Syvanne |
| 6,886,742 B2 | 5/2005 | Stoutenburg et al. | | 2003/0110129 A1 | 6/2003 | Frazier et al. |
| 6,892,302 B2 | 5/2005 | Wheeler et al. | | 2003/0120498 A1 | 6/2003 | Villapudua |
| 6,915,279 B2 | 7/2005 | Hogan et al. | | 2003/0126036 A1 | 7/2003 | Mascavage, III et al. |
| 6,915,430 B2 | 7/2005 | Wheeler et al. | | 2003/0126067 A1 | 7/2003 | Seifert et al. |
| 6,922,673 B2 | 7/2005 | Karas et al. | | 2003/0126075 A1 | 7/2003 | Mascavage, III et al. |
| 6,935,559 B2 | 8/2005 | Mollett et al. | | 2003/0126083 A1 | 7/2003 | Seifert et al. |
| 6,938,156 B2 | 8/2005 | Wheeler et al. | | 2003/0126437 A1 | 7/2003 | Wheeler et al. |
| 6,938,821 B2 | 9/2005 | Gangi | | 2003/0126739 A1 | 7/2003 | Prater |
| 6,950,940 B2 | 9/2005 | Wheeler et al. | | 2003/0130907 A1 | 7/2003 | Karas et al. |
| 6,952,773 B2 | 10/2005 | Wheeler et al. | | 2003/0130940 A1 | 7/2003 | Hansen et al. |
| 6,957,336 B2 | 10/2005 | Wheeler et al. | | 2003/0130948 A1 | 7/2003 | Algiene et al. |
| 6,957,770 B1 | 10/2005 | Robinson | | 2003/0135438 A1 | 7/2003 | Blagg et al. |
| 6,959,381 B2 | 10/2005 | Wheeler et al. | | 2003/0135459 A1 | 7/2003 | Abelman et al. |
| 6,978,369 B2 | 12/2005 | Wheeler et al. | | 2003/0154164 A1 | 8/2003 | Mascavage, III et al. |
| 6,981,154 B2 | 12/2005 | Wheeler et al. | | 2003/0158818 A1 | 8/2003 | George et al. |
| 6,990,470 B2 | 1/2006 | Hogan et al. | | 2003/0171992 A1 | 9/2003 | Blagg et al. |
| 6,991,157 B2 | 1/2006 | Bishop et al. | | 2003/0182218 A1 | 9/2003 | Blagg |
| 6,991,160 B2 | 1/2006 | Demere | | 2003/0187712 A1 | 10/2003 | Arthus et al. |
| 6,993,510 B2 | 1/2006 | Guy et al. | | 2003/0222136 A1 | 12/2003 | Bolle et al. |
| 7,003,479 B2 | 2/2006 | Cowell et al. | | 2003/0229541 A1 | 12/2003 | Randall et al. |
| 7,003,493 B2 * | 2/2006 | Weichert et al. | | 2003/0229578 A1 | 12/2003 | Hansen et al. |
| 7,010,691 B2 | 3/2006 | Wheeler et al. | | 2004/0006537 A1 | 1/2004 | Zelechoski et al. |
| 7,014,104 B2 | 3/2006 | MacFarlane et al. | | 2004/0039693 A1 | 2/2004 | Nauman et al. |
| 7,028,185 B2 | 4/2006 | Wheeler et al. | | 2004/0039702 A1 | 2/2004 | Blair et al. |
| 7,032,112 B2 | 4/2006 | Wheeler et al. | | 2004/0049452 A1 | 3/2004 | Blagg |
| 7,039,593 B2 | 5/2006 | Sager | | 2004/0054625 A1 | 3/2004 | Kellogg et al. |
| 7,047,414 B2 | 5/2006 | Wheeler et al. | | 2004/0064405 A1 | 4/2004 | Weichert et al. |
| 7,054,842 B2 | 5/2006 | James et al. | | 2004/0073511 A1 | 4/2004 | Beaumont et al. |
| 7,058,611 B2 | 6/2006 | Kranzley et al. | | 2004/0078327 A1 | 4/2004 | Frazier et al. |
| 7,070,094 B2 | 7/2006 | Stoutenburg et al. | | 2004/0083184 A1 | 4/2004 | Tsuei et al. |
| 7,082,533 B2 | 7/2006 | Wheeler et al. | | 2004/0088261 A1 | 5/2004 | Moore et al. |
| 7,083,081 B2 | 8/2006 | McGee et al. | | 2004/0117299 A1 | 6/2004 | Algiene et al. |
| 7,083,087 B1 | 8/2006 | Gangi | | 2004/0117302 A1 | 6/2004 | Weichert et al. |
| 7,086,584 B2 | 8/2006 | Stoutenburg et al. | | 2004/0138947 A1 | 7/2004 | McGee et al. |
| 7,089,421 B2 | 8/2006 | Wheeler et al. | | 2004/0139008 A1 | 7/2004 | Mascavage, III |
| 7,092,916 B2 | 8/2006 | Diveley et al. | | 2004/0148203 A1 | 7/2004 | Whitaker et al. |
| 7,096,205 B2 | 8/2006 | Hansen et al. | | 2004/0148239 A1 | 7/2004 | Albee et al. |
| 7,096,354 B2 | 8/2006 | Wheeler et al. | | 2004/0148286 A1 | 7/2004 | Rogers |
| 7,104,440 B2 | 9/2006 | Hansen et al. | | 2004/0153398 A1 | 8/2004 | Baumgartner et al. |
| 7,107,249 B2 | 9/2006 | Dively et al. | | 2004/0158521 A1 | 8/2004 | Newton et al. |
| 7,117,183 B2 | 10/2006 | Blair et al. | | 2004/0159699 A1 | 8/2004 | Nelson et al. |
| 7,158,955 B2 | 1/2007 | Diveley et al. | | 2004/0186773 A1 | 9/2004 | George et al. |
| 7,177,848 B2 | 2/2007 | Hogan et al. | | 2004/0205023 A1 | 10/2004 | Hafer et al. |
| 7,184,980 B2 | 2/2007 | Allen-Rouman et al. | | 2004/0210506 A1 | 10/2004 | Algiene et al. |

| | | | | | | |
|---|---|---|---|---|---|---|
| 2004/0210521 A1 | 10/2004 | Crea et al. | | WO | WO0030048 | 5/2000 |
| 2004/0210523 A1 | 10/2004 | Gains et al. | | WO | WO0033497 | 6/2000 |
| 2004/0215557 A1 | 10/2004 | Michelsen | | WO | WO0049586 | 8/2000 |
| 2004/0215574 A1 | 10/2004 | Michelsen et al. | | WO | WO0052900 | 9/2000 |
| 2004/0230527 A1 | 11/2004 | Hansen et al. | | WO | WO0054208 | 9/2000 |
| 2004/0260653 A1 | 12/2004 | Tsuei et al. | | WO | WO0129789 | 4/2001 |
| 2005/0005123 A1 | 1/2005 | Wheeler et al. | | WO | WO0146902 | 6/2001 |
| 2005/0005124 A1 | 1/2005 | Wheeler et al. | | WO | WO0150429 | 7/2001 |
| 2005/0010505 A1 | 1/2005 | Darrell | | WO | WO0154082 | 7/2001 |
| 2005/0015280 A1 | 1/2005 | Gabel et al. | | WO | WO0161920 | 8/2001 |
| 2005/0017067 A1 | 1/2005 | Seifert et al. | | WO | WO0169556 | 9/2001 |
| 2005/0075974 A1 | 4/2005 | Turgeon | | WO | WO0171675 | 9/2001 |
| 2005/0080691 A1 | 4/2005 | Holm-Blagg | | WO | WO0178024 | 10/2001 |
| 2005/0080730 A1 | 4/2005 | Sorrentino | | WO | WO0188659 | 11/2001 |
| 2005/0091116 A1 | 4/2005 | Monk | | WO | WO2005/052871 | 6/2005 |
| 2005/0091153 A1 | 4/2005 | Monk | | | | |
| 2005/0107152 A1 | 5/2005 | McGee et al. | | | | |
| 2005/0108127 A1 | 5/2005 | Brown et al. | | | | |
| 2005/0108130 A1 | 5/2005 | Monk | | | | |
| 2005/0114217 A1 | 5/2005 | Monk | | | | |
| 2005/0116027 A1 | 6/2005 | Algiene et al. | | | | |
| 2005/0119968 A1 | 6/2005 | Michelsen et al. | | | | |
| 2005/0119969 A1 | 6/2005 | Michelsen et al. | | | | |
| 2005/0137986 A1 | 6/2005 | Kean | | | | |
| 2005/0167481 A1 | 8/2005 | Hansen et al. | | | | |
| 2005/0177496 A1 | 8/2005 | Blagg et al. | | | | |
| 2005/0185774 A1 | 8/2005 | Grear et al. | | | | |
| 2005/0185780 A1 | 8/2005 | Grear et al. | | | | |
| 2005/0187782 A1 | 8/2005 | Grear et al. | | | | |
| 2005/0187830 A1 | 8/2005 | Grear et al. | | | | |
| 2005/0187841 A1 | 8/2005 | Grear et al. | | | | |
| 2005/0187864 A1 | 8/2005 | Grear et al. | | | | |
| 2005/0187865 A1 | 8/2005 | Grear et al. | | | | |
| 2005/0187870 A1 | 8/2005 | Grear et al. | | | | |
| 2005/0187938 A1 | 8/2005 | Grear et al. | | | | |
| 2005/0192874 A1 | 9/2005 | Grear et al. | | | | |
| 2005/0192895 A1 | 9/2005 | Rogers et al. | | | | |
| 2005/0192897 A1 | 9/2005 | Rogers et al. | | | | |
| 2005/0209961 A1 | 9/2005 | Michelsen et al. | | | | |
| 2005/0211763 A1 | 9/2005 | Sgambati et al. | | | | |
| 2005/0234817 A1 | 10/2005 | VanFleet et al. | | | | |
| 2005/0234822 A1 | 10/2005 | VanFleet et al. | | | | |
| 2005/0261968 A1 | 11/2005 | Randall et al. | | | | |
| 2005/0263587 A1 | 12/2005 | Martinez | | | | |
| 2005/0267840 A1 | 12/2005 | Holm-Blagg et al. | | | | |
| 2005/0288964 A1 | 12/2005 | Lutzen et al. | | | | |
| 2006/0005192 A1 | 1/2006 | Prendergast et al. | | | | |
| 2006/0016879 A1 | 1/2006 | Kean | | | | |
| 2006/0028319 A1 | 2/2006 | Kean et al. | | | | |
| 2006/0036496 A1 | 2/2006 | Cowell et al. | | | | |
| 2006/0036543 A1 | 2/2006 | Blagg et al. | | | | |
| 2006/0059040 A1 | 3/2006 | Eldred et al. | | | | |
| 2009/0108056 A1 | 4/2009 | Faust et al. | | | | |

FOREIGN PATENT DOCUMENTS

| | | |
|---|---|---|
| DE | 10050882 | 5/2002 |
| EP | 0656600 | 6/1995 |
| EP | 0661675 | 7/1995 |
| EP | 0722241 | 7/1996 |
| EP | 1017030 | 7/2000 |
| EP | 1028401 | 8/2000 |
| JP | 55143679 | 11/1980 |
| JP | 61253580 | 11/1986 |
| JP | 02148374 | 6/1990 |
| JP | 05040864 | 2/1993 |
| JP | 2004102784 | 4/2004 |
| WO | WO9216913 | 10/1992 |
| WO | WO9810363 | 3/1998 |
| WO | WO9812675 | 3/1998 |
| WO | WO9905633 | 2/1999 |
| WO | WO9938129 | 7/1999 |
| WO | WO9949424 | 9/1999 |
| WO | WO9957675 | 11/1999 |
| WO | WO0025262 | 5/2000 |

OTHER PUBLICATIONS

Curtis, Walt and Schnaidt, Patricia; Network Computing; "The electronic wallet. (Secure ID cards and digital cash)"; Nov. 15, 1994, V5, n14; p. 1.*

Internet Week; V.2, n. 43; "Mastercard to test IBM Digital Wallet; Software Will Open Market to Electronic Commerce"; pp. 1 and 2.*

Electronique International Hebdomadaire (EIH); "World Smart Cart Market to Develop"; Sep. 28, 1995; p. 1.*

"The History of Frequent Flyer Programs" From SmarterTravel, http://wiki.smartertravel.com/index.php/The_History_of_Frequent_Flyer_Programs, 2 pages, 1998.

"American Express India expands Membership Rewards program", M2 Presswire, Mar. 2000, http://findarticles.com/ p/articles/mi__hb5243/is__200003/a__n2007091 0/, 1 page.

"Continental Airlines: Continental Airlines introduces interactive customer loyalty program", M2 Presswire, Dec. 1999, 1 page.

"AmEx Rewards Beefed-Up", CardTrak Online, http://www.cardweb.com/cardtrak/news/1999/October/4a., 2 pp., Oct. 14, 1999.

"Midway Airlines joins American Express membership rewards programme", Airline Industry Information, Mar. 3, 2000, http://www.allbusiness.com/operations/shipping-aair-freight/448154-1., 3 pages.

Rowley, Jennifer, "Loyalty Kiosks: making loyalty cards work", British Food Journal, vol. 102, Issue 5/6, pp. 390-398, 2000.

Towitoko Electronics GmbH, "Product Overview Smartcard Terminals &Systems," Taufkirchen, 31 pages, Feb. 1998.

Vedder, K. et al., Smart Cards—Requirements, Properties and Applications, Gieseck &Devrient GmbH, 22 pages, 1998.

ActivCard, ActivCard, Inc., 12 pages, 1998.

OKI Advanced Products, OKI America, Inc., "Value-Checker.TM. CP," 3 pages, 1998.

Logis Chipcard Products,"Logismart Chipcard Readers—Worth Your Attention," 10 pages, 1998.

http://www.e-micro.com/, E-Micro Corporation, Apr. 2001.

Setec Oy, "Setpurse.TM.," Finland, 39 pages, 1998.

NURI Information &Communication Inc., "To Ensure Your Information Services NURI Smart Card Solutions," Korea, 21 pages, 1998.

Visa U.S.S., "VisaSmart" 9 pages, 1998.

ViVOwallet, found at www.vivotech.com, 15 pages, 2001.

Lindermayer, Isabelle, "First Data, Grocer Tie ACH Payments to Loyalty Cards", American Banker, The Financial Services Daily, 5 pages, Feb. 8, 2006.

Zapata, R., "Visa Hit with Suit Over No-Contact Credit Cards", IPLaw360, Portfolio Media Inc., 3 pages, Oct. 4, 2007.

EMV '96, "Integrated Circuit Card Terminal Specification for Payment Systems", Version 3.1.1, 116 pages, May 31, 1998.

ISO/IEC JTC I/SC 27, IT—Security Techniques, 4 pages, May 10, 1999.

Lindenmayer, "First Date, Grocer Tie ACH Payments to Loyalty Cards", American Banker, 5 pages, Feb. 8, 2006.

* cited by examiner

WALLET CONSOLIDATOR TO FACILITATE A TRANSACTION

RELATED APPLICATIONS

This application is a continuation of and claims priority to U.S. patent application Ser. No. 12/721,769 filed Mar. 11, 2010, titled "Wallet Consolidator to Facilitate a Transaction", which application is a continuation of and claims priority to and the benefit of U.S. patent application Ser. No. 11/931,479 filed Oct. 31, 2007, titled "Wallet Consolidator to Facilitate A Transaction", which is a divisional of and claims priority to and the benefit of U.S. patent application Ser. No. 09/923,617, filed Aug. 6, 2001, titled "Wallet Consolidator and Related Methods of Processing a Transaction Using a Wallet Consolidator," now U.S. Pat. No. 7,340,885 which is a continuation of U.S. patent application Ser. No. 09/618,407, filed Jul. 18, 2000, titled "Wallet Consolidator," now U.S. Pat. No. 6,293,462, which is a continuation of U.S. patent application Ser. No. 09/087,193, filed May 29, 1998, titled "Wallet Consolidator," now U.S. Pat. No. 6,131,811, each incorporated herein by reference in their entireties.

BACKGROUND OF THE INVENTION

1. Field of the Invention

The present invention pertains in general to the use of electronic smart cards for the storage of information pertaining to electronic commerce and consumer identification, and in particular, but not by way of limitation, to an apparatus for the warehousing and retrieval of information pertaining to credit cards, debit cards, identification cards, and other selected data.

2. Description of Related Art

In today's electronic commerce there has been a proliferation in the use of various types of credit, debit, identification, and other types of authorization cards. For example, an average individual is likely to carry a driver's license, several credit and debit cards, an identification card for access to a health club, an identification card to gain access to a place of employment, and an access card to gain entry into a parking garage, among others. Furthermore, with advances in electronic commerce, smart cards are likely to replace paper and coin money resulting in an additional card for consumers to carry. Each of these cards typically incorporates a magnetic stripe or bar code to facilitate easy recognition of the card and to store various types of data. Although the use of these cards allows for easy and efficient electronic commerce, the number of such cards quickly becomes cumbersome and many individuals find carrying the large number of cards inconvenient.

Attempts have been made to use a single smart card to hold the various information contained on several cards. These attempts, however, involve the downloading of information from the smart card provider and do not allow a smart card user to control the contents of the device by adding additional information from newly issued cards or removing information from discontinued cards.

It would be advantageous, therefore, to devise an apparatus for consolidating the various cards, and other types of information, which individuals typically carry in a wallet or purse, it would further be advantageous if such an apparatus stored the information in a central location and facilitated the use of a single multi-purpose card. It would still further be advantageous if such an apparatus allowed the user of the apparatus the ability to control the stored information.

SUMMARY OF THE INVENTION

In view of the foregoing, embodiments of the present invention advantageously provide a wireless device or apparatus, also known as a wallet consolidator, capable of warehousing digitized information stored on various types of credit, debit, identification, and other types of authorization cards, including identification information, some or all of which to be delivered to various computing devices and possibly a portion to a device operator located with the computer device. According to an embodiment of the present invention, a wallet consolidator to warehouse information pertaining to at least one card and to retrieve the warehoused information to facilitate a transaction at a point-of-sale terminal can include, for example, a housing, one or more input devices associated with the housing and positioned to receive information, and a memory device associated with then housing and positioned to store at least a portion of the information received by the one or more input devices. One or more input devices, for example, can be positioned to receive information associated with the at least one card so that at least a portion of the information received by the one or more input devices enables a point-of-sale transaction. The at least one card can be, for example, a credit card, a debit card, an identification card, or an electronic coupon. The one or more input devices, for example, can include a magnetic stripe reader/writer for reading and writing magnetic stripes, a bar code scanner for scanning bar codes, a keypad, a touch sensitive display screen, or an input cluster among others, to input user selections and commands.

An embodiment of the wallet consolidator can also include a radio frequency wireless communication interface associated with the housing and adapted to communicate with a point-Of-sale terminal thereby to provide at least a portion of the information stored in the memory device to the point-of-sale terminal, a display screen, and a controller positioned within the housing in communication with each of the one or more input devices, the memory device, the radio frequency wireless communication interface, and the display screen. The display screen, for example, can be configured to display a menu of functions to a user. The menu of functions, can, for instance, include one or more of: adding card information, deleting card information, duplicating information, transferring information, moving cash, and accessing information. The information received by the one or more input devices, can include, for example, identification information. Moreover, the controller, according to an embodiment of the wallet consolidator can be positioned, for example, to control input of the information into the memory device of the wallet consolidator through the one or more input devices, display of the menu of functions to a user through the display screen, retrieval of at least a portion of the information from the memory device, and output of at least a portion of the information stored in the memory device through the radio frequency wireless communication interface to the point-of-sale terminal. A user, for example, can select the at least a portion of the information using one of the one or more input devices and position the wallet consolidator in communication with the point-of-sale terminal to enable a point-of-sale transaction responsive to the point-of-sale terminal receiving the at least a portion of the information communicated thereto from the wallet consolidator to thereby facilitate a transaction at the point-of-sale terminal.

In another embodiment of the present invention, for example, the one or more input devices can be, for example, connected to the housing and can include at least one keypad. Additionally, the memory device can be, for example a memory positioned within the housing, and the radio frequency wireless communication interface can be, for instance, connected to the housing. Moreover, the display screen can be connected to the housing and positioned on a same face of the housing as the at least one keypad, and the controller can be positioned within the housing and can be in communication with each of the one or more input devices, the memory, the display screen, and the wireless communication interface. Also according to an embodiment of the present invention, the at least a portion of the information stored in the memory device of the wallet consolidator can be transmitted to various computing devices such as, but not limited to, point-of-sale terminals, dumb terminals, and databases, positioned to process a point-of-sale transaction effectuated pursuant to the at least a portion of the information. The at least a portion of the information stored in the memory device of the wallet consolidator can be communicated to the various computing devices via a data interface, a infrared transceiver, or a radio frequency wireless communication interface.

More specifically, according to an embodiment of the present invention, the one or more input devices can be associated with the housing and positioned to receive information associated with at least one card from one or both of a remote database and a user so that at least a portion of the information received by one of the one or more input devices enables a transaction. Additionally, for example, the radio frequency wireless communication interface can be associated with the housing and adapted to be positioned to communicate with a remote database thereby to provide the at least a portion of the information stored in the memory to a remote database. Also according to an embodiment of the present invention, the controller can be positioned to control input of the information into the memory of the wallet consolidator through the one or more input devices, display the menu of functions to a user through the display screen, retrieve the at least a portion of the information from the memory, and output the at least a portion of the information stored in the memory through the radio frequency wireless communication interface to a remote database. A user, for example, can select the at least a portion of the information using one of the one or more input devices and position the wallet consolidator in communication with a remote database to enable a transaction responsive to a remote database receiving the at least a portion of the information communicated thereto from the wallet consolidator to thereby facilitate a transaction.

According to an exemplary embodiment of the present invention, the one or more input devices can include at least on keypad, and the display screen can be connected to the housing and beneficially positioned on a same face of the housing as the at least one keypad. Furthermore, the information displayed on the display screen can comprise information from the memory device being displayed as controlled by the controller. Additionally, the information received by the one or more input devices can include information included on a plurality of different cards, the cards being selected from the group of credit cards, debit cards, identification cards, and electronic coupons. Also according to an embodiment of the present invention, the one or more input devices can be adapted to receive an input of a passcode from a user to gain 4 access to the wallet consolidator so that the controller displays the menu of functions after the user gains access to the wallet consolidator by entering the passcode through the one of the one or more input devices. Moreover, the one or more input devices, for example, can further include a touch sensitive display screen associated with the display screen, associated with the housing, and positioned adjacent to the at least one keypad. In an embodiment of the present invention, the at least one keypad can comprise a first keypad, and the touch sensitive display screen can include a second keypad.

According to another embodiment of the present invention, the memory device can be configured to have sufficient memory to store a digitized image. The digitized image can include, for instance, a digitized image of a signature, a portrait, the at least one card, and a bar code. The controller can, for example, be configured to operably store the digitized image in the memory device of the wallet consolidator and to display the digitized image on the display screen of the wallet consolidator, Furthermore, the digitized image displayed on the display screen can be adapted to be used at a point-of-sale terminal. The controller, for example can be further configured to store a digitized image of a bar code in the memory device of the wallet consolidator and can be adapted to display the digitized image of a bar code on the display screen so that the displayed digitized image of a bar code can be scannable by a bar code scanner. In another embodiment of the present invention, the information stored in the memory device of the wallet consolidator can include at least one bar code and the controller can be configured to operably display the bar code on the display screen to thereby define a displayed bar code image. The displayed bar code image, for example, can be adapted to be scannable by a bar code scanner.

According to an embodiment of the wallet consolidator, in it's most generalized configuration, the one or more input devices can include, but is not limited to, one or more of the following: a magnetic stripe card reader, a bar code reader, a keypad, a touch screen, a smart card reader, a kiosk, a memory card, a telephony interface, a wireless interface, a wireline communication interface, a wireless communication interface, an infrared (IR) interface, and a radio frequency (RF) interface. The memory device can include, but is not limited to, one or more of the following: semiconductor memory, a smart card (contact, contactless, or hybrid), a memory card (portable flash memory), random access memory (RAM), magnetic memory, a hard disk, a magnetic tape, an optical memory device, and an optical disc. Also according to an 5 embodiment of the present invention, the wallet consolidator can include, for example, a communication interface. The communication interface can include, but is not limited to, one or more of the following: a data interface, a telephony interface, a wireless interface, a wireline communication interface, a wireless communication interface, a radio frequency (RF) interface, an infrared (IR) interface, and a display configured for displaying scannable bar codes.

To store information in the wallet consolidator, for example, or alternatively in a smart card interfaced to the wallet consolidator, information can be read from magnetic stripes on various types of cards such as, but not limited to, credit, debit, and identification cards. A bar code scanner allows a bar code to be scanned from a card and stored in the memory device. Additionally, images of the cards including, but not limited to, signatures and portraits can be downloaded, and with sufficient memory, stored for future use. A user can retrieve information using the one or more input devices for use in, for example, a point-of-sale transaction. The stored images can be retrieved and displayed on a display screen, including a bar code, which can be scanned by a bar code scanner.

According to another embodiment of a wallet consolidator, the wallet consolidator can include one or more input devices positioned to receive information stored on at least one card, a memory device connected to the one or more input devices to store the information received by the input device, and a communication interface connected to the memory device and positioned to transmit at least a portion of the information stored in the memory device to a point-of-sale terminal located at a point-of-sale. The point-of-sale terminal can be positioned to process a transaction responsive to the at least a portion of the information. The information can include, for example, account identification information pertaining to at least one of the following: one or more credit cards, one or more debit cards, one or more identification cards, one or more electronic coupons, one or more medical records, one or more health club membership accounts, or one or more food stamp accounts. Accordingly, the at least one card can include one or more credit cards, one or more debit cards, one or more identification cards, one or more electronic coupons, one or more medical record cards, one or more health club identification access cards, one or more employment identification access cards, one or more parking garage access cards, or one or more food stamp identification cards. The information can also include driver's license data taken from, for example, a driver's license card. Further, the information can include a digitized image of the at least one card, to thereby provide further 6 functionality. Advantageously, the communication interface can include a wireless communication interface such as, for example, a wireless interface, a wireless communication interface, or a radio frequency (RF) wireless communication interface, to thereby enhance personal mobility.

According to another embodiment of the present invention, a wallet consolidator includes a controller positioned to control operation of the wallet consolidator, one or more input devices in communication with the controller and positioned to receive a copy of identification information stored on at least one card, a memory device in communication with the controller and positioned to store the identification information received by the one or more input devices, and a communication interface in communication with the controller and positioned to transmit at least a portion of the identification information stored in the memory device to a point-of-sale terminal located at a point-of-sale. The point-of-sale terminal can be positioned to process a point-of-sale transaction responsive to the at least a portion of the identification information. According to an embodiment of the wallet consolidator, the information can include identification information contained on the at least one card, and the communication interface can be wireless and can include, for example, a wireless interface, a wireless communication interface, or a radio frequency (RF) Wireless communication interface, to thereby enhance personal mobility.

According to another embodiment of a wallet consolidator, the wallet consolidator can include one or more input devices positioned to receive information stored on at least one card, a memory device connected to the input device to store the information received by the input device, and a wireless communication interface connected to the memory device and positioned to transmit at least a portion of the information stored in the memory device to a point-of-sale terminal located at a point-of-sale. The point-of-sale terminal can be positioned to process a transaction responsive to the at least a portion of the information.

According to another embodiment of a wallet consolidator, the wallet consolidator can include one or more input devices positioned to receive information stored on at least one card, a memory device connected to the one or more input devices to store the information received by the one or more input devices, and a communication interface connected to the memory device and positioned to effectuate communication of at least a portion of the 7 information stored in the memory device to a point-of-sale terminal located at a point-of-sale when the point-of-sale terminal is positioned to receive the at least a portion of the information from the wallet consolidator for use in a point-of-sale transaction. The communication interface can include, for example, a data interface, a telephone interface, an infrared transceiver, a wireless communication interface, or a radio frequency (RF) wireless communication interface.

According to another embodiment of a wallet consolidator, the wallet consolidator can include a controller positioned to control operation of the wallet consolidator, one or more input devices in communication with the controller and positioned to receive information contained on at least one card, a memory device in communication with the controller and positioned to store the information received by the one or more input devices, and a wireless Communication interface in communication with the controller and positioned to interface with a point-of-sale terminal located at a point-of-sale to provide at least a portion of the information stored in the memory device to the point-of-sale terminal. The point-of-sale terminal can be positioned to enable a transaction 'responsive to receiving the at least a portion of the information.

According to another embodiment of a wallet consolidator, the wallet consolidator can include a controller positioned to control operation of the wallet consolidator, one or more input devices in communication with the controller and positioned to receive information contained on at least one card, a memory device in communication with the controller and positioned to store the information received by the input device, and a wireless communication interface in communication with the controller. The wireless communication interface is adapted to be positioned to interface or to effectuate communication with a point-of-sale terminal located at a point-of-sale to provide at least a portion of the information stored in the memory device to the point-of-sale terminal when the wallet consolidator is positioned adjacent the point-of-sale terminal to thereby enable a transaction responsive to receiving the at least a portion of the information.

BRIEF DESCRIPTION OF THE DRAWINGS

So that the manner in which the features and advantages of the invention, as Well as others which will become apparent, may be understood in more detail, a more particular description of the invention briefly summarized above may be had by reference to the 8 embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

Figure 1:
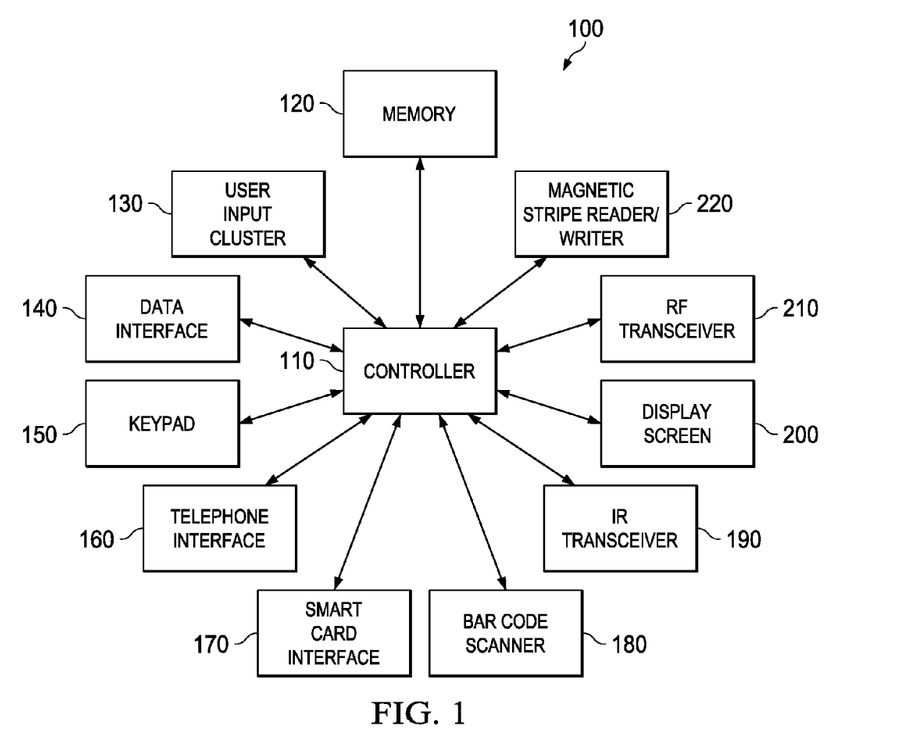
FIG. 1 is a functional block diagram of the wallet consolidator.

Referring now to FIG. 1, there is illustrated a functional block diagram of a wallet consolidator shown generally at 100. The functional components of the wallet consolidator 100 can include a controller 110, a memory device 120, a user input cluster 130, a data interface 140, a keypad 150, a telephone interface 160, a smart card interface 170, a bar code scanner 180, an infrared (IR) transceiver 190, a display screen 200, a radio â€ frequency (RF) transceiver 210, and a magnetic stripe reader/writer 220.

The controller 110 controls the overall operation of the wallet consolidator 100 including the coordination of the various functional blocks. The magnetic stripe reader/writer 220 is used to read and write information from and to magnetic stripes used on credit cards, debit cards, and identification cards among others. Information read from the magnetic stripes by the magnetic stripe reader/writer 220 can be stored in the memory device 120 of the wallet consolidator 100. In an alternative embodiment, the information can be stored in a memory device located within a smart card which is commonly known in the industry. In situations where the information from the magnetic stripe is stored in the memory device of the smart card, the information can be written into the memory of the smart card using the smart card interface 170. The smart card interface 170 can effectuate reading and writing from and to the smart card.

A keypad 150 can be used as a user input device for inputting information or indicating selections and actions to the wallet consolidator 100. In an embodiment of the present invention, the keypad 150 is a numeric keypad, however; in an alternative embodiment the keypad 150 is an alphanumeric keypad. The user input cluster 130 provides an additional user input device for communicating selections and actions to the wallet consolidator 100. While it is understood that the user input cluster 130 can have any number of input buttons, a preferred 1 0 configuration includes an up and a down button for moving through options provided to the user on the display screen 200, a delete button for removing items from the display screen, and an activate button for making a selection or enabling an action by the wallet consolidator 100.

The bar code scanner 180 allows a user to scan bar codes such as on the face of identification, credit, debit, and other types of cards and to store the bar code in the memory device 120 of the wallet consolidator, or alternatively, in the memory device of the smart card. In either event, the user can select the bar code for display on the display screen 200 such that the bar code, as displayed on the display screen 200, is readable by a bar code scanner.

In addition to displaying items stored in the memory device 120 of the wallet consolidator 100, or alternatively the memory device of the smart card, the display screen 200 can be used for programming, or otherwise controlling, the operation of the wallet consolidator 100. For example, the display screen 200, in conjunction with the keypad 150 or the user input cluster 130, can be used by the user to input a passcode to gain access to the wallet consolidator 100. In an alternative embodiment, the keypad 150 can be effectuated using a touch sensitive display screen 200.

After gaining access to the wallet consolidator 100, the controller 110 can display a menu of functions on the display screen 200 and the user can make a selection by either using the user input cluster 130 to scroll through and select an option or by directly selecting an option using the keypad 150. The types of options can include, but are not limited to, selecting a card to add or delete, duplicating information, transferring data, moving cash, or accessing various types of information such as electronic coupons, identification information, or medical records among others. Based on the selected option, the wallet consolidator 100, via the display screen 200, can traverse an action tree which instructs the user on the use of the wallet consolidator 100.

The data interface 140 and telephone interface 160 can effectuate communication between the wallet consolidator 100 and various computing devices such as, but not limited to, point-of-sale terminals, dumb terminals, and databases. The data interface 140 can use a serial data port, a parallel data port, or any other data communication technique. In a similar fashion, the telephone interface 160 can allow communication via a wireline or wireless telecommunication network. Furthermore, the infrared transceiver 190 and the radio frequency transceiver 210 can effectuate wireless communication between the wallet consolidator 100 and various computing devices such as, but not limited to, point-of-sale terminals, dumb terminals, and databases, which are equipped with a similar infrared transceiver or radio frequency transceiver.

The wallet consolidator 100, according to an embodiment of the present invention, can allow an individual to swipe his or her credit, debit, identification, or other type cards through the magnetic stripe reader/writer 220 and store the information contained in the magnetic stripe in the memory device 120 of the wallet consolidator 100, or alternatively, in the memory device of the smart card. The wallet consolidator 100 can also allow an individual to scan a bar code on a card using the bar code scanner 180 and store the bar code in the wallet consolidator 100, or alternatively in the memory device of the smart card. Furthermore the individual can download the image of the cards or other cards which do not have a magnetic stripe and, with sufficient memory, store a digitized image in the memory device 120 of the wallet consolidator 100, or alternatively in the memory device of the smart card. Additionally, other types of information can be stored in either the memory device 120 of the wallet consolidator 100 or the memory device of the smart card. Among other types of information, items such as electronic coupons or food stamp balances can be stored and then redeemed during a point-of-sale transaction. Communication with various computing devices such as, but not limited to, point-of-sale terminals, dumb terminals, and databases, can be effectuated using the telephone interface 160, the radio frequency transceiver 210, the infrared transceiver 190, or the display screen 200.

Figure 2:
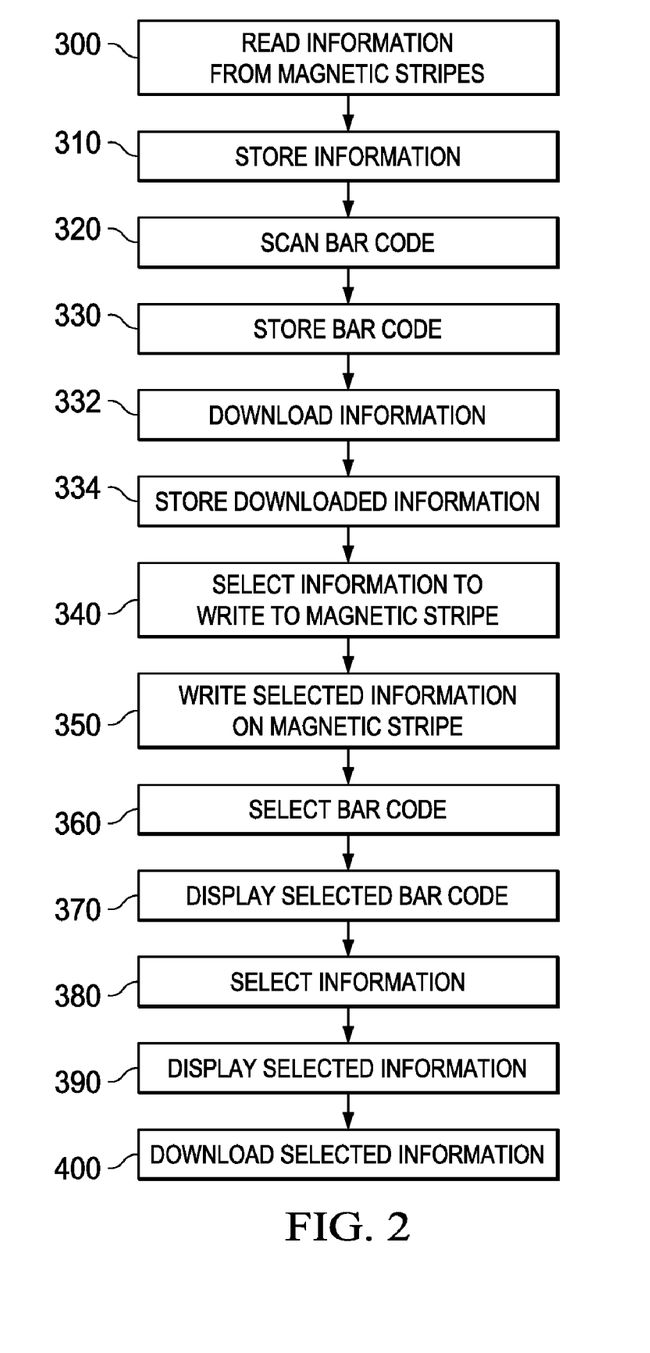
FIG. 2 is a flow diagram of a preferred method for consolidating card information using the wallet consolidator described in FIG. 1.

Referring additionally now to FIG. 2, there is illustrated a flow diagram of a preferred computer implemented method for consolidating card information using the wallet consolidator 100 described in FIG. 1. Information stored on magnetic stripes can be entered into the wallet consolidator 100 by swiping the subject identification, credit, debit, or other type of card through the magnetic stripe reader/writer 220 to read the information from the magnetic stripe of the subject card (step 300). Alternatively, the information can be entered into the wallet consolidator 100 via the data interface 140, the keypad 150, the telephone interface 160, the infrared transceiver 190, or the radio frequency transceiver 210. The entered information can be stored in the memory device 120 of the wallet consolidator 100, or alternatively, in the memory device of the smart card (step 310). 1 2

Similarly, bar codes from the cards can be scanned (step 320) and the bar codes can be stored in the memory device 120 of the wallet consolidator 100, or alternatively, in the memory device of the smart card (step 330). Alternatively, the information can be entered into the wallet consolidator 100 via the data interface 140, the keypad 150, the telephone interface 160, the infrared transceiver 190, or the radio frequency transceiver 210.

Still further, other information such as electronic coupons or images such as portraits and signatures can be downloaded into the wallet consolidator 100 (step 332) and stored in the memory device 120 of the wallet consolidator 100, or alternatively, in the memory device of the smart card (step 334). The information can be downloaded into the wallet consolidator 100 via the data interface 140, the keypad 150, the telephone interface 160, the infrared transceiver 190, or the radio 'frequency transceiver 210.

To retrieve magnetic stripe information from the wallet consolidator 100, the user can select the desired information using either the user input cluster 130 or the keypad 150 (step 340). Once the information has been selected, the information can be written onto a magnetic stripe of the smart card or other multi-use card (step 350). Alternatively, the information which was selected can be communicated to various computing devices such as, but not limited to, point-of-sale terminals, dumb terminals, and databases via the data interface 140, the telephone interface 160, the infrared transceiver 190, or the radio frequency transceiver 210.

Similarly, the user can select a desired bar code using either the user input cluster 130 or the keypad 150 (step 360), and the selected image can be displayed on the display screen 200 (step 370). Alternatively, the selected information can be communicated to various computing devices such as, but not limited to, point-of-sale terminals, dumb terminals, and databases via the data interface 140, the telephone interface 160, the infrared transceiver 190, or the radio frequency transceiver 210.

Still further, the user can select stored information, including downloaded information (step 380), and display the selected information (step 390) or download the selected information (step 400) to various computing devices such as, but not limited to, point-of-sale terminals, dumb terminals, and databases via the data interface 140, the telephone interface 160, the infrared transceiver 190, or the radio frequency transceiver 210.

Figure 3:
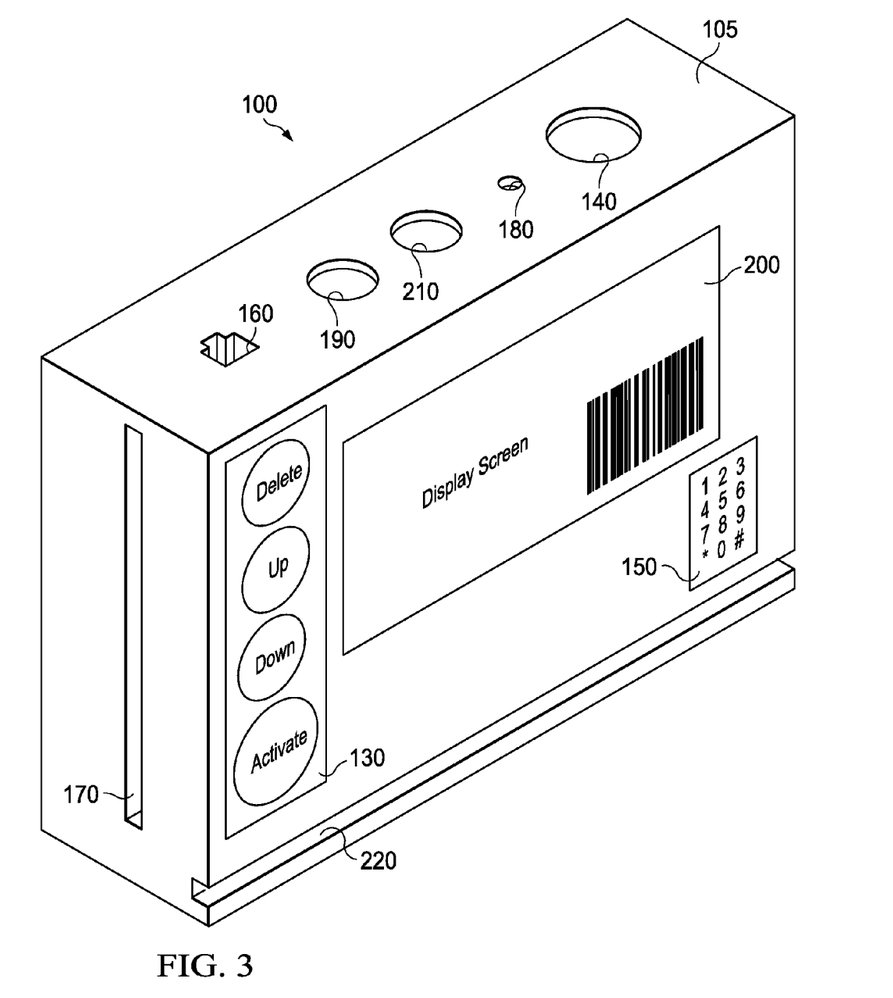
FIG. 3 is a perspective view of a wallet consolidator consistent with a preferred embodiment of the present invention.

Referring now to FIG. 3, there is illustrated a perspective view of a wallet consolidator 100. The wallet consolidator, shown generally at 100, can include a housing 105, the controller 110 which is located internally and not shown, the memory device 120 also located internally and not shown, the user input cluster 130, the data interface 140, the keypad 150, the telephone interface 160, the smart card interface 170, the bar code scanner 180, the infrared transceiver 190, the display screen 200, the radio frequency transceiver 210, and the magnetic stripe reader/writer 220, This application is related to U.S. patent application Ser. No. 11/932,049, filed Oct. 31, 2007, titled "Wallet Consolidator and Related Methods of Processing a Transaction Using a Wallet Consolidator"; U.S. patent application Ser. No. 09/923,617, filed Aug. 6, 2001, titled "Wallet Consolidator and Related Methods of Processing a Transaction Using a Wallet Consolidator" now U.S. Pat. No. 7,349,885; U.S. patent application Ser. No. 09/618,407, filed Jul. 18, 2000, titled "Wallet Consolidator," now U.S. Pat. No. 6,293,462; and U.S. patent application Ser. No. 09/087,193, filed May 29, 1998, titled "Wallet Consolidator," now U.S. Pat. No. 6,131,811, each incorporated herein by reference in their entireties.

In the drawings and specification, there have been disclosed a typical preferred embodiment of the invention, and although specific teems are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. A method of conducting a point-of-sale transaction using a coupon comprising:

storing in a hand held device identification information for a consumer;

storing in the hand held device electronic commerce information relating to at least one of a credit card, a debit card, and an identification card;

storing in the hand held device information relating to the coupon;

transmitting from the hand held device to a point-of-sale terminal the electronic commerce information for making payment on the transaction; and transmitting from the hand held device to the point-of-sale terminal the coupon information for completing the transaction.

2. The method of claim 1, further comprising:

transmitting from the hand held device to the point-of-sale terminal the identification information to authorize the transaction.

3. The method of claim 1, wherein the step of transmitting the coupon information comprises displaying a bar code to a bar code scanner for the point-of-sale transaction.

4. The method of claim 1, wherein the step of transmitting the electronic commerce information comprises transmitting the electronic commerce information wirelessly to the point-of-sale terminal.

5. The method of claim 1, further comprising receiving at least one of the coupon information, the identification information, and the electronic commerce information from a remote database over a wireless telecommunications network.

6. The method of claim 1, further comprising receiving at least one of the coupon information, the identification information, and the electronic commerce information using a scanner.

7. The method of claim 1, wherein the identification information includes an electronic signature.

8. The method of claim 7, wherein the electronic signature is a digitized image.

9. The method of claim 1, further comprising:

transmitting from the hand held device to a remote database information relating to the transaction.

10. The method of claim 9, wherein the information relating to the transaction is transmitted over a wireless telecommunication network.

* * * * *